United States Patent
Willingham et al.

(10) Patent No.: US 7,343,972 B2
(45) Date of Patent: Mar. 18, 2008

(54) SYSTEM STABILIZERS AND PERFORMANCE ENHANCERS FOR AQUEOUS FLUIDS GELLED WITH VISCOELASTIC SURFACTANTS

(75) Inventors: John Robert Willingham, Cypress, TX (US); Allen D. Gabrysch, Houston, TX (US); Patrick A. Kelly, Conroe, TX (US); James B. Crews, Willis, TX (US); James H. Treadway, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 239 days.

(21) Appl. No.: 11/125,465

(22) Filed: May 10, 2005

(65) Prior Publication Data

US 2005/0252658 A1    Nov. 17, 2005

Related U.S. Application Data

(60) Provisional application No. 60/570,601, filed on May 13, 2004.

(51) Int. Cl.
*E21B 43/04* (2006.01)
*E21B 43/26* (2006.01)
*E21B 43/27* (2006.01)

(52) U.S. Cl. .................... 166/279; 166/278; 166/283; 166/300; 166/307; 166/308.2

(58) Field of Classification Search .................. None
See application file for complete search history.

(56) References Cited

U.S. PATENT DOCUMENTS

| | | | |
|---|---|---|---|
| 6,180,571 B1 * | 1/2001 | Sifferman et al. .......... 507/110 |
| 6,433,075 B1 | 8/2002 | Davies et al. | |
| 6,605,570 B2 | 8/2003 | Miller et al. | |
| 6,703,352 B2 | 3/2004 | Dahayanake et al. | |
| 6,828,280 B2 | 12/2004 | England et al. | |
| 2002/0125012 A1 * | 9/2002 | Dawson et al. ............. 166/300 |
| 2003/0188870 A1 | 10/2003 | Hinkel et al. | |

* cited by examiner

*Primary Examiner*—Zakiya W. Bates
(74) *Attorney, Agent, or Firm*—Madan Mossman & Sriram PC

(57) ABSTRACT

An aqueous, viscoelastic fluid gelled with a viscoelastic surfactant (VES) is stabilized and improved with an effective amount of an alkali earth metal oxide and/or alkali earth metal hydroxide. These fluids are more stable and have reduced or no tendency to precipitate, particularly at elevated temperatures. The additives may also increase viscosity to the point where less VES is required to maintain a given viscosity. These stabilized, enhanced, aqueous viscoelastic fluids may be used as treatment fluids for subterranean hydrocarbon formations, such as in hydraulic fracturing.

28 Claims, 3 Drawing Sheets

SYSTEM STABILIZERS AND PERFORMANCE ENHANCERS FOR AQUEOUS FLUIDS GELLED WITH VISCOELASTIC SURFACTANTS

CROSS-REFERENCE TO RELATED APPLICATION

This application claims the benefit of U.S. provisional application No. 60/570,601 filed May 13, 2004.

FIELD OF THE INVENTION

The present invention relates to aqueous, viscoelastic fluids used during hydrocarbon recovery operations, and more particularly relates, in one embodiment, to methods and additives for stabilizing and improving such aqueous, viscoelastic fluids.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations.

Aqueous fluids gelled with viscoelastic surfactants (VESs) are also known in the art. However, under some conditions, the VES-gelled fluids will separate and/or precipitate over time, for instance at high temperatures. It would be desirable if a composition and method could be devised to stabilize and enhance aqueous VES-gelled fluids used in injection of treatment fluids such as fracturing fluids.

SUMMARY OF THE INVENTION

Accordingly, it is an object of the present invention to provide an aqueous treatment fluid, such as those used in hydrocarbon recovery operations, that is viscosified with a non-polymer, viscoelastic surfactant (VES) that is stable.

It is another object of the present invention to provide a method for treating a subterranean formation using an aqueous viscoelastic fluid that has been stabilized and inhibited against precipitation.

Still another object of the invention is to provide an aqueous viscoelastic fluid gelled with a VES that is stabilized and inhibited against precipitation at relatively high temperatures.

In carrying out these and other objects of the invention, there is provided, in one form, a method for treating a subterranean formation that involves providing an aqueous viscoelastic treating fluid. The fluid includes an aqueous base fluid, a viscoelastic surfactant (VES) gelling agent, and an amount of additive effective to either increase stability and/or reduce precipitation. The additive may be an alkaline earth metal oxide and/or an alkaline earth metal hydroxide. Further in the method, the aqueous viscoelastic surfactant treating fluid is injected through a wellbore into the subterranean formation. The subterranean formation is then treated with the fluid.

There is further provided in another non-limiting embodiment of the invention an aqueous viscoelastic treating fluid that includes an aqueous base fluid, a viscoelastic surfactant (VES) gelling agent, and an amount of additive effective to either increase stability and/or reduce precipitation. Again, the additive is may be an alkaline earth metal oxide and/or alkaline earth metal hydroxide.

DETAILED DESCRIPTION OF THE INVENTION

Figure 1:
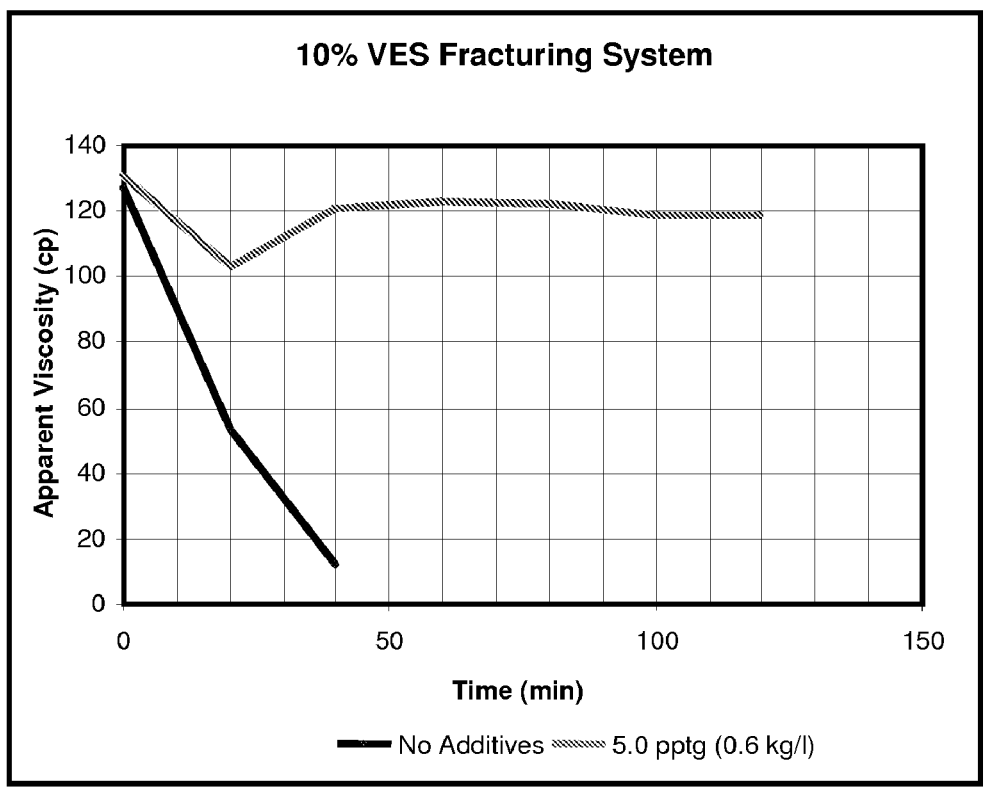
FIG. 1 is a graph of the apparent viscosity of a 10% VES aqueous fracturing system at 270° F. (132° C.) over time with and without 5.0 pptg MgO stabilizer.

It has been discovered that the addition of alkaline earth metal oxides, such as magnesium oxide, and alkaline earth metal hydroxides, such as calcium hydroxide, to an aqueous fluid gelled with a VES increased the viscosity of the fluid, stabilized the fluid, and prevented or inhibited the precipitation of solids in these brines. In particular, the VES-gelled aqueous fluids are more stable at high temperatures, such as at 200° F. (93° C.) or higher. This discovery will allow the VES system to be used at a higher temperature, and will help minimize formation damage after hydraulic fracturing operations. The introduction of these additives to the VES systems could possibly lower the amount of VES surfactant needed to obtain the fluid viscosity necessary to perform VES applications or treatments.

In the method of the invention, an aqueous fracturing fluid, as a non-limiting example, is first prepared by blending a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid, for a non-limiting example.

The brines useful in the fluids of this invention may be prepared using salts including, but not necessarily limited to, NaCl, KCl, $CaCl_2$, $MgCl_2$, $NH_4Cl$, $CaBr_2$, $NaBr_2$, sodium formate, potassium formate, and other commonly used stimulation and completion brine salts. The concentration of the salts to prepare the brines can be from about 0.5% by weight of water up to near saturation for a given salt in fresh water, such as 10%, 20%, 30% and higher percent salt by weight of water. The brine can be a combination of one or more of the mentioned salts, such as a brine prepared using NaCl and $CaCl_2$ or NaCl, $CaCl_2$, and $CaBr_2$ as non-limiting examples.

Any suitable mixing apparatus may be used for this procedure. In the case of batch mixing, the VES and the aqueous fluid are blended for a period of time sufficient to form a gelled or viscosified solution. The VES that is useful in the present invention can be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference.

Viscoelastic surfactants improve the fracturing (frac) fluid performance through the use of a polymer-free system. These systems offer improved viscosity breaking, higher sand transport capability, are more easily recovered after treatment, and are relatively non-damaging to the reservoir. The systems are also more easily mixed "on the fly" in field operations and do not require numerous co-additives in the fluid system, as do some prior systems.

The viscoelastic surfactants suitable for use in this invention include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™, which may also comprise greater than 10% of a glycol. One preferred VES is an amine oxide. As noted, a particularly preferred amine oxide is tallow amido propylamine oxide (TAPAO), sold by Baker Oil Tools as SurFRAQ™ VES. SurFRAQ is a VES liquid product that is 50% TAPAO and 50% propylene glycol. These viscoelastic surfactants are capable of gelling aqueous solutions to form a gelled base fluid. The additives of this invention may also be used in Diamond FRAQ™ which is a VES system, similar to SurFRAQ, which contains VES breakers sold by Baker Oil Tools.

The amount of VES included in the fracturing fluid depends on two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the range for the present invention is from about 1.0 to about 6.0% by volume VES product. In an alternate, non-restrictive form of the invention, the amount of VES ranges from 2 to about 10 volume %.

The additives of this invention include, but are not necessarily limited to alkaline earth metal oxides or alkaline earth metal hydroxides or mixtures thereof. In one non-limiting embodiment, the alkaline earth metal in these additives is magnesium, calcium, barium and/or strontium. In one non-restrictive embodiment, the amount of additive ranges from about 0.5 to about 40 pounds per thousand gallons (pptg) (about 0.06 to about 4.8 kg/1000 liters) of aqueous fluid. In another non-limiting version, the amount ranges from about 2 to about 10 pptg (about 0.24 to about 1.2 kg/1000 liters).

As noted it has been discovered that aqueous viscoelastic treating fluid treated with these additives have improved stability as compared with an otherwise identical fluid absent the additive. This is particularly true at elevated temperatures, such as equal to or greater than about 200° F. (about 93° C.) or above. Alternatively, this temperature may be equal to or greater than about 220° F. (about 104° C.) or above, or in another non-limiting embodiment equal to or greater than about 230° F. (about 110° C.) or above. Additionally or alternatively, the aqueous viscoelastic treating fluid containing this additive has reduced precipitates as compared with an otherwise identical fluid absent the additive. It should be understood that it is not necessary for precipitation to be completely eliminated for the invention to be considered successful, although precipitation prevention is certainly a goal.

It has also been discovered that the viscosity of the VES-gelled aqueous fluid may increase using the additives of this invention. Thus, since the viscoelastic surfactants are relatively more expensive, less of the VES than normal may be used with the additives of this invention to achieve the same viscosity, thereby reducing the total cost of the gelled fluid.

In hydraulic fracturing applications, propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations can be used as the fracture design requires. The base fluid can also contain other conventional additives common to the well service industry such as water wetting surfactants, non-emulsifiers and the like. In this invention, the base fluid can also contain additives which can contribute to breaking the gel (reducing the viscosity) of the VES fluid.

While the viscoelastic fluids of the invention are described most typically herein as having use in fracturing fluids, it is expected that they will find utility in acidizing fluids, gravel pack fluids, stimulation fluids and the like. Of course, when the treatment fluid is a fracturing fluid, the fluids also contain at least an effective amount of a proppant to prop open the fractures, and the fluid is injected into the formation under sufficient and effective hydraulic pressure and pump rate to fracture the formation. When the treatment fluid is an acidizing fluid, it further contains an effective amount of an acid, either inorganic or organic, of sufficient strength to acidize the formation. When the viscoelastic surfactants are used in a gravel packing fluid, the gelling agent helps contain an effective amount of the gravel within the fluid. If the viscoelastic surfactants are used in another well stimulation fluid, an effective amount of any additional stimulating agent is employed. When the viscoelastic surfactants are used in a fluid loss control application, an effective amount of a salt or easily removed solid is employed, and the amine oxide gelling agents help suspend the salts or solids in the fluid. These other components of the treatment fluids are well known in the art.

In another embodiment of the invention, the treatment fluid may contain other viscosifying agents, other surfactants, clay stabilization additives, scale dissolvers, biopolymer degradation additives, and other common components.

The proppant, solid particle or gravel may be any solid particulate matter suitable for its intended purpose, for example as a screen or proppant, etc. Suitable materials include, but are not necessarily limited to sand, sintered bauxite, sized calcium carbonate, sized salts, ceramic beads, and the like, and combinations thereof. These solids may also be used in a fluid loss control application.

A basic method is to inject the proppant into a carrier fluid or treatment brine downstream from the conventional pumps which are delivering the gravel packing fluid, e.g. To do this, the proppant is suspended in the viscosified brine. The proppant may thus be delivered by a small injection pump to the carrier fluid at an injection point downstream from the pumps used to transport the gravel packing fluid or other treatment fluid.

The invention will be further described with respect to the following Examples which are not meant to limit the invention, but rather to further illustrate the various embodiments.

EXAMPLES 1-2

The invention was tested in 10.5 ppg (1.26 kg/liter) calcium chloride brine at 270° F. (132° C.). Example 1 did not contain any alkaline earth metal additive. Viscosity was measured on a Grace Instrument Company M5500 HTHP Viscometer at the indicated shear rates at the time intervals indicated in Table I. It may be seen that for each shear rate, the viscosity at this temperature rapidly drops as a function of time. Testing was stopped after only 40 minutes.

For Example 2, 5.0 pptg (0.6 kg/l) MgO system stabilizer was added to the system of Example 1 and testing at the same shear rates over time was performed. However, it may be seen that the viscosity only decreased slightly over time. Testing was discontinued after two hours since it seemed the treated VES-gelled aqueous fluid was stable. FIG. 1 is a plot of the Example 1 and Example 2 viscosity data as a function of time for the 100 sec-1 shear rate showing the contrast between the two and the great improvement in stability made by the additive.

TABLE I

| Time (min) | 511 sec$^{-1}$ | 170 sec$^{-1}$ | 100 sec$^{-1}$ | 40 sec$^{-1}$ |
|---|---|---|---|---|
| 10% VES System @ 270° F. (132° C.) | | | | |
| Example 1: 10% VES in 10.5 ppg (1.26 kg/liter) CaCl$_2$ Brine @ 270° F. (132° C.) (no additives) | | | | |
| 0 | 75 | 107 | 127 | 170 |
| 20 | 34 | 46 | 53 | 68 |
| 40 | 8 | 10 | 12 | 15 |
| Ex. 2: 10% VES in 10.5 ppg (1.26 kg/liter) CaCl$_2$ Brine @ 270° F. (132° C.) (5.0 pptg (0.6 kg/l) System Stabilizer) | | | | |
| 0 | 78 | 110 | 131 | 176 |
| 20 | 63 | 88 | 103 | 136 |
| 40 | 72 | 102 | 121 | 162 |
| 60 | 73 | 104 | 123 | 164 |
| 80 | 73 | 103 | 122 | 163 |
| 100 | 71 | 101 | 119 | 159 |
| 120 | 71 | 101 | 119 | 159 |

EXAMPLE 3

Figure 2:
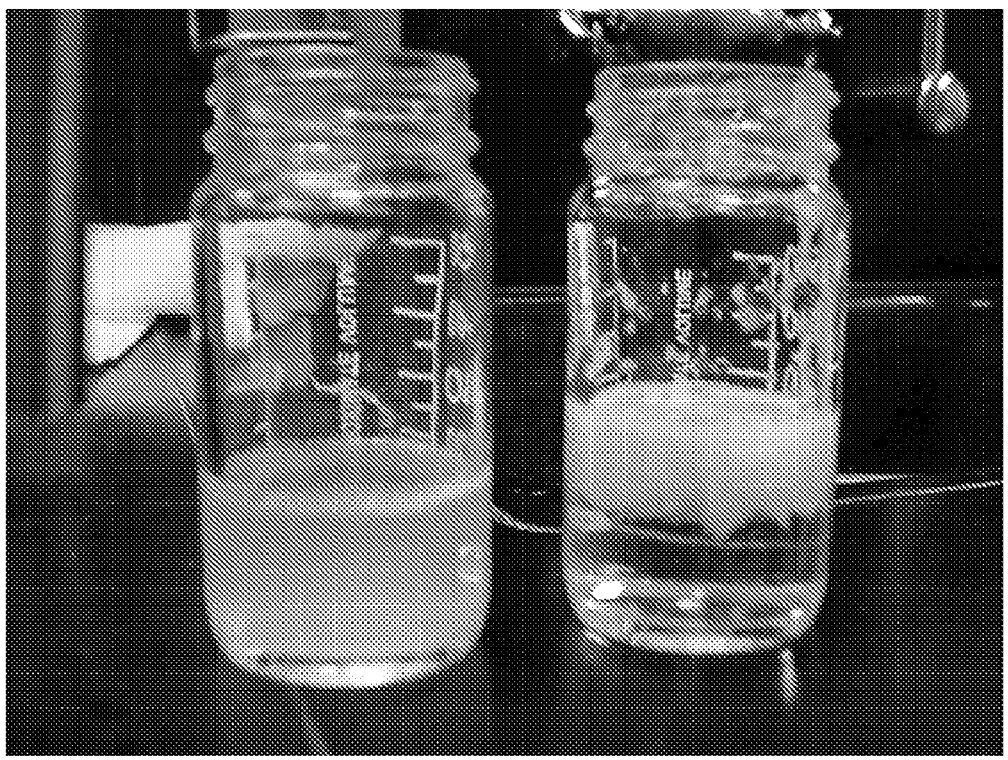
FIG. 2 is a photograph showing two fluids containing the same VES loading in the same brine fluid, where the fluid without MgO (bottle on right) shows VES precipitation and the fluid with MgO (bottle on left) does not show VES precipitation.

Two otherwise identical brine fluids having the same VES loading are shown in the photograph of FIG. 2. The fluid on the left contains the magnesium oxide stabilizing additive of the invention while the fluid on the right does not. After being tested at a temperature greater than 200° F. (93° C.), the fluid without the magnesium oxide shows the precipitation of the VES surfactant, whereas the fluid with the magnesium oxide does not show VES surfactant precipitation.

EXAMPLES 4-6

Figure 3:
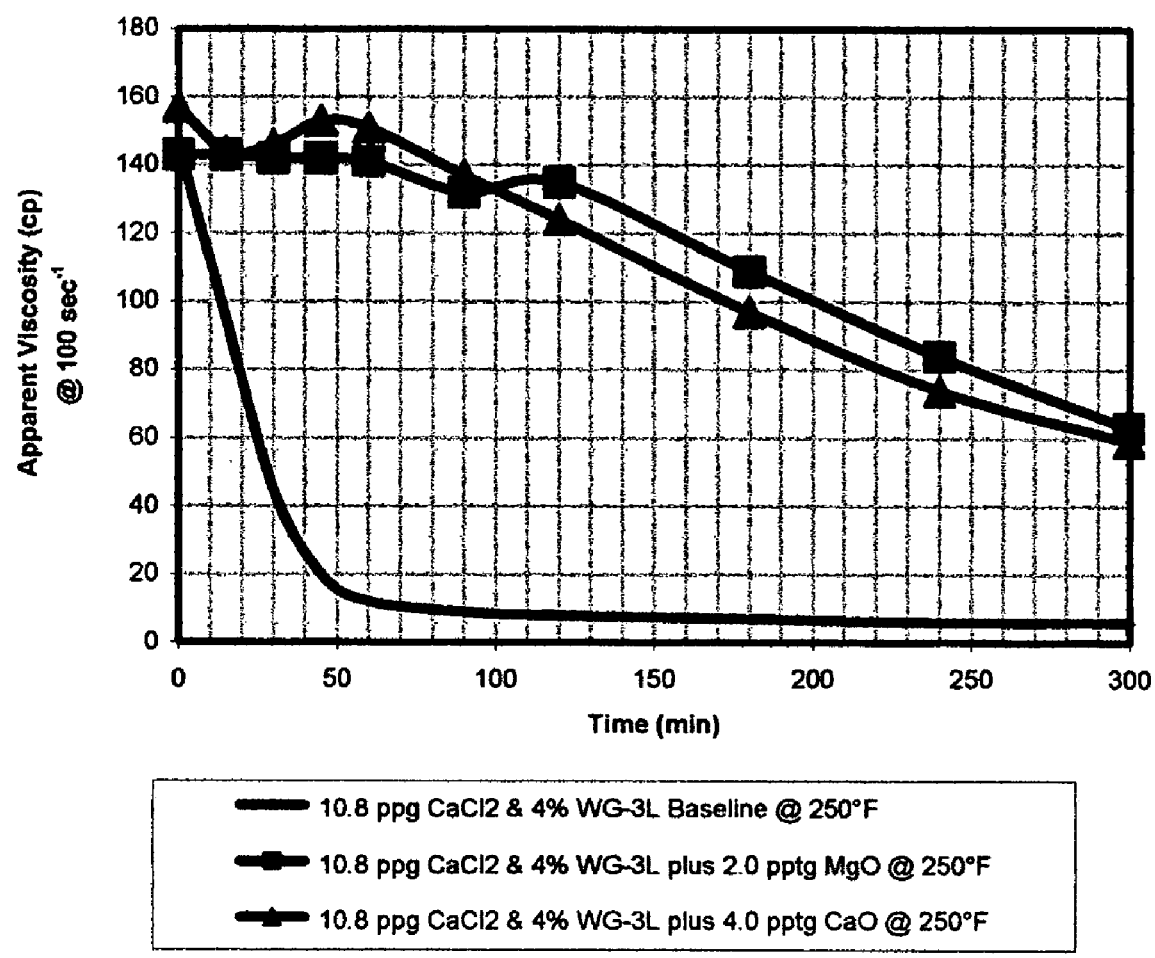
FIG. 3 is a graph of the apparent viscosity of a 4% VES aqueous fracturing system at 250° F. (121° C.) over time without an additive, and with 2.0 pptg MgO and 4.0 pptg CaO stabilizers.

The invention was further tested in 10.8 ppg (1.3 kg/liter) calcium chloride brine with 4% SurFRAQ™ WG-3L VES surfactant at 250° F. (121° C.). Example 4 did not contain any alkaline earth metal additive. Examples 5 and 6 used 2.0 pptg (0.24 kg/liter) MgO stabilizer and 4.0 pptg (0.42 kg/liter) CaO stabilizers respectively. Viscosity was measured as indicated for Examples 1 and 2. As can be seen from the data presented in Table II and plotted in FIG. 3, viscosity decreased rapidly with no additive, but only much slower with the additives.

TABLE II

VES Systems with Oxide Stabilizers

| Time (min) | 511 sec$^{-1}$ | 170 sec$^{-1}$ | 100 sec$^{-1}$ | 40 sec$^{-1}$ |
|---|---|---|---|---|
| Example 4: 4% VES in 10.8 ppg (1.3 kg/liter) CaCl$_2$ Brine @ 250° F. (121° C.) (no additives Baseline) | | | | |
| 0 | 67 | 114 | 146 | 225 |
| 15 | 59 | 82 | 95 | 124 |
| 30 | 25 | 37 | 45 | 63 |
| 45 | 12 | 17 | 20 | 27 |
| 60 | 8 | 11 | 12 | 15 |
| 90 | 6 | 8 | 9 | 12 |
| 120 | 6 | 7 | 8 | 9 |
| 180 | 4 | 6 | 7 | 10 |
| 240 | 4 | 5 | 6 | 8 |
| 300 | 4 | 5 | 6 | 8 |
| Example 5: 4% VES in 10.8 ppg (1.3 kg/liter) CaCl$_2$ Brine @ 250° F. (121° C.) (2.0 pptg (0.24 kg/liter) MgO Stabilizer) | | | | |
| 0 | 71 | 114 | 143 | 211 |
| 15 | 115 | 133 | 143 | 162 |
| 30 | 119 | 134 | 142 | 156 |
| 45 | 92 | 123 | 142 | 181 |
| 60 | 88 | 121 | 141 | 184 |
| 90 | 91 | 117 | 132 | 162 |
| 120 | 85 | 116 | 135 | 175 |
| 180 | 66 | 92 | 109 | 145 |
| 240 | 50 | 71 | 84 | 112 |
| 300 | 39 | 54 | 63 | 83 |
| Example 5: 4% VES in 10.8 ppg (1.3 kg/liter) CaCl$_2$ Brine @ 250° F. (121° C.) (4.0 pptg (0.42 kg/liter) CaO Stabilizer) | | | | |
| 0 | 79 | 125 | 157 | 232 |
| 15 | 94 | 126 | 144 | 183 |
| 30 | 97 | 128 | 146 | 184 |
| 45 | 90 | 129 | 153 | 206 |
| 60 | 88 | 127 | 151 | 204 |
| 90 | 80 | 115 | 137 | 186 |
| 120 | 72 | 104 | 124 | 169 |
| 180 | 56 | 81 | 97 | 132 |
| 240 | 38 | 59 | 74 | 108 |
| 300 | 29 | 47 | 59 | 88 |

EXAMPLES 7-10

Figure 4:
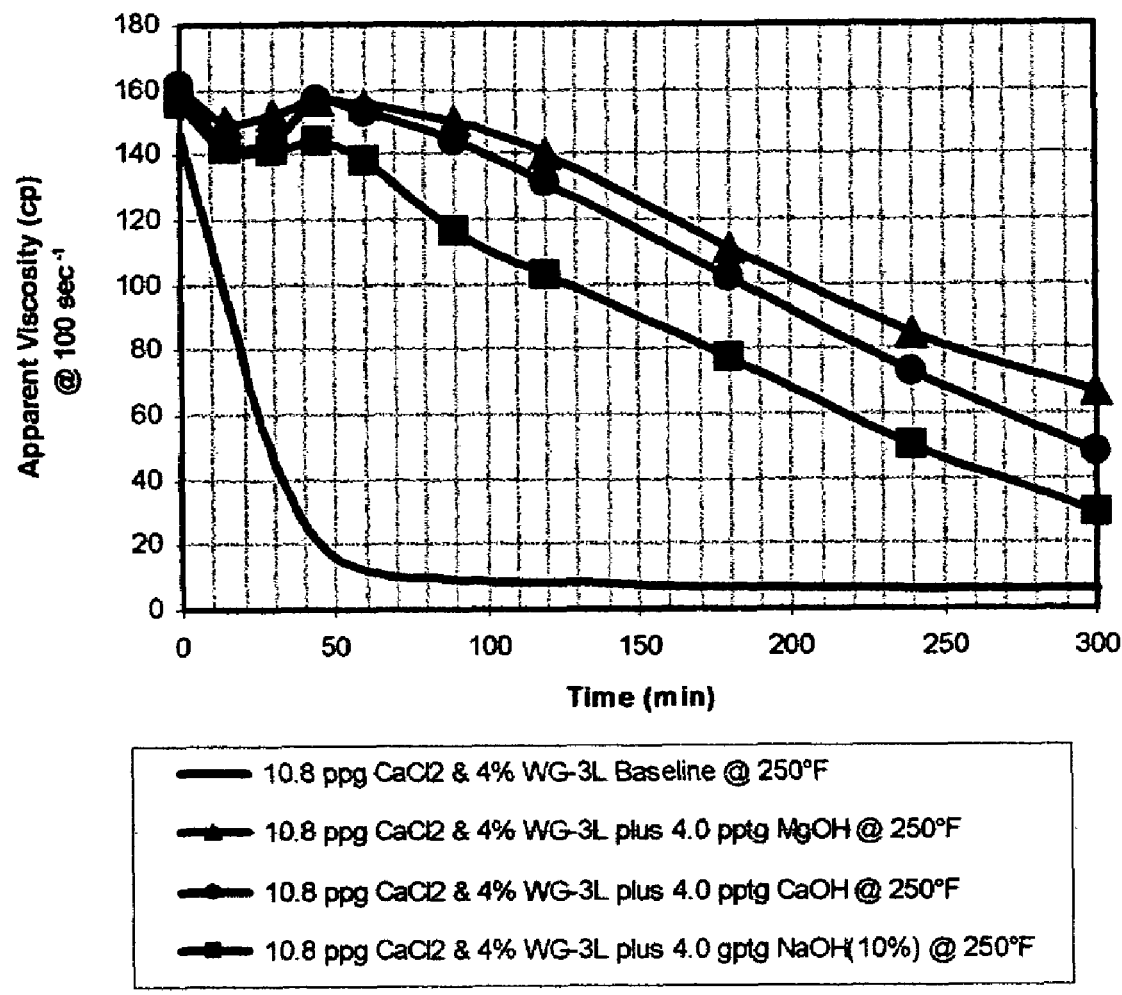
FIG. 4 is a graph of the apparent viscosity of a 4% VES aqueous fracturing system at 250° F. (121° C.) over time without an additive, and with 4.0 pptg MgOH, 4.0 pptg CaOH and 4.0 pptg NaOH stabilizers.

The invention was additionally tested in 10.8 ppg (1.3 kg/liter) calcium chloride brine with 4% SurFRAQ™ WG-3L VES surfactant at 250° F. (121° C.). Example 7 did not contain any alkaline earth metal additive. Examples 8, 9 and 10 used 4.0 pptg (0.42 kg/liter) MgOH, CaOH and NaOH stabilizers respectively. Viscosity was measured as indicated for Examples 1 and 2. As can be seen from the data presented in Table III and plotted in FIG. 4, viscosity decreased rapidly with no additive, but only much slower with the additives.

TABLE III

VES Systems with Hydroxide Stabilizers

| Time (min) | 511 sec$^{-1}$ | 170 sec$^{-1}$ | 100 sec$^{-1}$ | 40 sec$^{-1}$ |
|---|---|---|---|---|
| Example 7: 4% VES in 10.8 ppg (1.3 kg/liter) CaCl$_2$ Brine @ 250° F. (121° C.) (no additives Baseline) | | | | |
| 0 | 67 | 114 | 146 | 225 |
| 15 | 59 | 82 | 95 | 124 |
| 30 | 25 | 37 | 45 | 63 |
| 45 | 12 | 17 | 20 | 27 |
| 60 | 8 | 11 | 12 | 15 |
| 90 | 6 | 8 | 9 | 12 |
| 120 | 6 | 7 | 8 | 9 |
| 180 | 4 | 6 | 7 | 10 |
| 240 | 4 | 5 | 6 | 8 |
| 300 | 4 | 5 | 6 | 8 |
| Example 8: 4% VES in 10.8 ppg (1.3 kg/liter) CaCl$_2$ Brine @ 250° F. (121° C.) (4.0 pptg (0.42 kg/liter) MgOH Stabilizer) | | | | |
| 0 | 78 | 127 | 161 | 242 |
| 15 | 93 | 128 | 150 | 197 |
| 30 | 96 | 131 | 152 | 197 |
| 45 | 91 | 131 | 157 | 214 |
| 60 | 90 | 130 | 155 | 210 |
| 90 | 87 | 126 | 150 | 203 |
| 120 | 78 | 116 | 140 | 194 |
| 180 | 63 | 92 | 111 | 153 |
| 240 | 44 | 68 | 85 | 123 |
| 300 | 31 | 52 | 67 | 102 |
| Example 9: 4% VES in 10.8 ppg (1.3 kg/liter) CaCl$_2$ Brine @ 250° F. (121° C.) (4.0 pptg CaOH (0.42 kg/liter) Stabilizer) | | | | |
| 0 | 78 | 127 | 161 | 243 |
| 15 | 97 | 126 | 143 | 178 |
| 30 | 95 | 126 | 144 | 182 |
| 45 | 87 | 129 | 157 | 219 |
| 60 | 85 | 126 | 153 | 213 |
| 90 | 79 | 118 | 144 | 202 |
| 120 | 72 | 108 | 131 | 183 |
| 180 | 56 | 84 | 102 | 142 |
| 240 | 37 | 59 | 73 | 106 |
| 300 | 23 | 38 | 48 | 72 |
| Example 10: 4% VES in 10.8 ppg (1.3 kg/liter) CaCl$_2$ Brine @ 250° F. (121° C.) (4.0 pptg (0.42 kg/liter) NaOH Stabilizer) | | | | |
| 0 | 75 | 123 | 156 | 236 |
| 15 | 88 | 122 | 142 | 185 |
| 30 | 91 | 122 | 141 | 180 |
| 45 | 86 | 122 | 144 | 192 |
| 60 | 80 | 116 | 138 | 187 |
| 90 | 66 | 96 | 116 | 160 |
| 120 | 58 | 86 | 103 | 142 |
| 180 | 38 | 61 | 77 | 115 |
| 240 | 25 | 40 | 50 | 74 |
| 300 | 14 | 23 | 29 | 43 |

In the foregoing specification, the invention has been described with reference to specific embodiments thereof, and has been demonstrated as effective in providing a treatment fluid with stable surfactant gel viscosity. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, alkaline earth metal oxides and alkaline earth metal hydroxides and other components falling within the claimed parameters, but not specifically identified or tried in a particular composition, are anticipated to be within the scope of this invention.

We claim:

1. A method for treating a subterranean formation comprising:
   providing an aqueous viscoelastic treating fluid comprising:
   an aqueous base fluid;

a viscoelastic surfactant (VES) gelling agent; and an amount of additive effective to produce an effect selected from the group consisting of increasing stability, reducing precipitation and the combination thereof, where the additive is selected from the group consisting of alkaline earth metal oxides, alkaline earth metal hydroxides, and mixtures thereof;

injecting the aqueous viscoelastic surfactant treating fluid through a wellbore and into the subterranean formation; and treating the subterranean formation.

2. The method of claim 1 where the aqueous base fluid is brine.

3. The method of claim 1 where in the additive, the alkaline earth metal is selected from the group consisting of magnesium, calcium, strontium, barium and mixtures thereof.

4. The method of claim 1 where the effective amount of the additive ranges from about 0.5 to about 40.0 pptg (about 0.06 to about 4.8 kg/1000 liters) based on aqueous viscoelastic treating fluid.

5. The method of claim 1 where the aqueous viscoelastic treating fluid has an effect selected from the group consisting of:

improved stability as compared with an otherwise identical fluid absent the additive, reduced precipitates as compared with an otherwise identical fluid absent the additive, and both.

6. The method of claim 1 where the VES is selected from the group consisting of non-ionic, cationic, amphoteric, and zwitterionic surfactants.

7. The method of claim 1 where the VES is selected from the group consisting of amines, amine salts, quaternary ammonium salts, amidoamine oxides and amine oxides.

8. The method of claim 1 where the VES is present in the aqueous base fluid in a proportion from about 0.5 to about 25 vol. %.

9. The method of claim 1 where the VES is a non-ionic amine oxide surfactant.

10. The method of claim 1 where treating the subterranean formation is selected from the group consisting of fracturing the formation under effective pressure where the aqueous viscoelastic treating fluid further comprises a proppant;

acidizing the formation where the aqueous viscoelastic treating fluid further comprises an acid;

packing the formation with gravel where the aqueous viscoelastic treating fluid further comprises gravel;

stimulating the formation where the aqueous viscoelastic treating fluid further comprises a stimulating agent;

controlling fluid loss where the aqueous viscoelastic treating fluid further comprises a salt or easily removed solid; and mixtures thereof.

11. The method of claim 1 where for a period of time during the method the fluid is at a temperature of about 200° F. (about 93° C.) or above.

12. A method for treating a subterranean formation comprising:

providing an aqueous viscoelastic treating fluid comprising:

an aqueous brine base fluid;

a viscoelastic surfactant (VES) gelling agent; and from about 0.5 to about 40.0 pptg (about 0.06 to about 4.8 kg11000 liters) based on the aqueous viscoelastic treating fluid of an additive selected from the group consisting of alkaline earth metal oxides, alkaline earth metal hydroxides, and mixtures thereof;

injecting the aqueous viscoelastic surfactant treating fluid through a wellbore and into the subterranean formation; and treating the subterranean formation.

13. The method of claim 12 where in the additive, the alkaline earth metal is selected from the group consisting of magnesium, calcium, strontium, barium and mixtures thereof.

14. The method of claim 12 the aqueous viscoelastic treating fluid has an effect selected from the group consisting of:

improved stability as compared with an otherwise identical fluid absent the additive, reduced precipitates as compared with an otherwise identical fluid absent the additive, and both.

15. The method of claim 12 where treating the subterranean formation is selected from the group consisting of fracturing the formation under effective pressure where the aqueous viscoelastic treating fluid further comprises a proppant;

acidizing the formation where the aqueous viscoelastic treating fluid further comprises an acid;

packing the formation with gravel where the aqueous viscoelastic treating fluid further comprises gravel;

stimulating the formation where the aqueous viscoelastic treating fluid further comprises a stimulating agent;

controlling fluid loss where the aqueous viscoelastic treating fluid further comprises a salt or easily removed solid; and mixtures thereof.

16. The method of claim 12 where for a period of time during the method the fluid is at a temperature of about 200° F. (about 93° C.) or above.

17. An aqueous viscoelastic treating fluid comprising:

an aqueous base fluid;

a viscoelastic surfactant (VES) gelling agent; and an amount of additive effective to produce an effect selected from the group consisting of increasing stability, reducing precipitation and the combination thereof, where the additive is selected from the group consisting of alkaline earth metal oxides, alkaline earth metal hydroxides, and mixtures thereof.

18. The aqueous viscoelastic treating fluid of claim 17 where the aqueous base fluid is brine.

19. The aqueous viscoelastic treating fluid of claim 17 where in the additive, the alkaline earth metal is selected from the group consisting of magnesium, calcium, strontium, barium and mixtures thereof.

20. The aqueous viscoelastic treating fluid of claim 17 where the effective amount of the additive ranges from about 0.5 to about 40.0 pptg (about 0.06 to about 4.8 kg/1000 liters) based on the aqueous viscoelastic treating fluid.

21. The aqueous viscoelastic treating fluid of claim 17 further comprising a property selected from the group consisting of improved stability as compared with an otherwise identical fluid absent the additive, reduced precipitates as compared with an otherwise identical fluid absent the additive, or both.

22. The aqueous viscoelastic treating fluid of claim 17 where the VES is selected from the group consisting of non-ionic, cationic, amphoteric, and zwitterionic surfactants.

23. The aqueous viscoelastic treating fluid of claim 17 where the VES is selected from the group consisting of amines, amine salts, quaternary ammonium salts, amidoamine oxides and amine oxides.

24. The aqueous viscoelastic treating fluid of claim 17 where the VES is present in the aqueous base fluid in a proportion from about 0.5 to about 25 vol. %.

25. The aqueous viscoelastic treating fluid of claim 17 where the VES is a non-ionic amine oxide surfactant.

26. An aqueous viscoelastic treating fluid comprising:
an aqueous brine base fluid;
a viscoelastic surfactant (VES) gelling agent; and
about 0.5 to about 40.0 pptg (about 0.06 to about 4.8 kg/1000 liters) based on the aqueous viscoelastic treating fluid of an additive, where the additive is selected from the group consisting of alkaline earth metal oxides, alkaline earth metal hydroxides, and mixtures thereof.

27. The aqueous viscoelastic treating fluid of claim 26 where in the additive, the alkaline earth metal is selected from the group consisting of magnesium, calcium, strontium, barium and mixtures thereof.

28. The aqueous viscoelastic treating fluid of claim 26 further comprising a property selected from the group consisting of improved stability as compared with an otherwise identical fluid absent the additive, reduced precipitates as compared with an otherwise identical fluid absent the additive, or both.

* * * * *